United States Patent
Zhang et al.

(10) Patent No.: US 12,531,395 B2
(45) Date of Patent: Jan. 20, 2026

(54) LASER DIODE

(71) Applicants: ASAHI KASEI KABUSHIKI KAISHA, Tokyo (JP); National University Corporation Tokai National Higher Education and Research System, Nagoya (JP)

(72) Inventors: Ziyi Zhang, Tokyo (JP); Maki Kushimoto, Nagoya (JP); Hiroshi Amano, Nagoya (JP)

(73) Assignees: ASAHI KASEI KABUSHIKI KAISHA, Tokyo (JP); National University Corporation Tokai National Higher Education and Research System, Nagoya (JP)

( * ) Notice: Subject to any disclaimer, the term of this patent is extended or adjusted under 35 U.S.C. 154(b) by 969 days.

(21) Appl. No.: 17/754,027

(22) PCT Filed: Sep. 25, 2020

(86) PCT No.: PCT/JP2020/036467
§ 371 (c)(1),
(2) Date: Mar. 22, 2022

(87) PCT Pub. No.: WO2021/060538
PCT Pub. Date: Apr. 1, 2021

(65) Prior Publication Data
US 2022/0337035 A1    Oct. 20, 2022

(30) Foreign Application Priority Data
Sep. 27, 2019    (JP) ................................ 2019-177788

(51) Int. Cl.
*H01S 5/22*    (2006.01)
*H01S 5/02*    (2006.01)
(Continued)

(52) U.S. Cl.
CPC .............. *H01S 5/34* (2013.01); *H01S 5/0206* (2013.01); *H01S 5/026* (2013.01); *H01S 5/2216* (2013.01); *H01S 5/34333* (2013.01)

(58) Field of Classification Search
CPC .............. H01S 5/34333; H01S 5/2216; H01S 5/2211; H01S 5/2214; H10H 20/824; H10H 20/8242; H10H 20/825; H10H 20/8252
See application file for complete search history.

(56) References Cited

U.S. PATENT DOCUMENTS

| 6,031,858 A | 2/2000 | Hatakoshi et al. |
| 9,680,057 B2 * | 6/2017 | Moe .................... H10H 20/8162 |

(Continued)

FOREIGN PATENT DOCUMENTS

| CN | 108140695 A | 6/2018 |
| JP | H09331116 A | 12/1997 |

(Continued)

OTHER PUBLICATIONS

Dec. 8, 2020, International Search Report issued in the International Patent Application No. PCT/JP2020/036467.

(Continued)

*Primary Examiner* — Minsun O Harvey
*Assistant Examiner* — Fernanda Adriana Camacho Alanis
(74) *Attorney, Agent, or Firm* — KENJA IP LAW PC

(57) ABSTRACT

A laser diode (1) includes an AlN single crystal substrate (11), an n-type cladding layer (12) formed on the substrate and including a nitride semiconductor layer having n-type conductivity, a light-emitting layer (14) formed on the n-type cladding layer and including one or more quantum wells, a p-type cladding layer (20) formed on the light-emitting layer and including a nitride semiconductor layer having p-type conductivity, and a p-type contact layer (18) formed on the p-type cladding layer and including a nitride (Continued)

semiconductor that includes GaN. The p-type cladding layer includes a p-type longitudinal conduction layer (16) that includes $Al_sGa_{1-s}N$ (0.3≤s≤1), has a composition gradient such that the Al composition s decreases with increased distance from the substrate, and has a film thickness of less than 0.5 μm, and a p-type transverse conduction layer (17) that includes $Al_tGa_{1-t}N$ (0<t≤1).

9 Claims, 1 Drawing Sheet

(51) Int. Cl.
*H01S 5/026* (2006.01)
*H01S 5/34* (2006.01)
*H01S 5/343* (2006.01)

(56) References Cited

U.S. PATENT DOCUMENTS

| | | | |
|---|---|---|---|
| 9,741,896 B2* | 8/2017 | Lai | H01S 5/34333 |
| 2006/0222029 A1* | 10/2006 | Ohgoh | H01S 5/34326 |
| | | | 372/45.01 |
| 2009/0250719 A1* | 10/2009 | Fujimori | H01S 5/22 |
| | | | 257/E29.089 |
| 2013/0099141 A1 | 4/2013 | Chua | |
| 2014/0077224 A1* | 3/2014 | Li | H01S 5/0207 |
| | | | 257/77 |
| 2016/0149078 A1* | 5/2016 | Takeuchi | H01S 5/34333 |
| | | | 257/13 |
| 2017/0084779 A1 | 3/2017 | Moe et al. | |
| 2017/0309781 A1 | 10/2017 | Moe et al. | |
| 2019/0103509 A1 | 4/2019 | Lachab | |
| 2019/0214527 A1 | 7/2019 | Moe et al. | |
| 2020/0220330 A1 | 7/2020 | Eichler et al. | |

FOREIGN PATENT DOCUMENTS

| | | |
|---|---|---|
| JP | H11186601 A | 7/1999 |
| JP | 2013187309 A | 9/2013 |
| JP | 2015002324 A | 1/2015 |
| JP | 2018532265 A | 11/2018 |
| JP | 2018200928 A | 12/2018 |
| WO | 2019057789 A1 | 3/2019 |

OTHER PUBLICATIONS

Kosuke Sato et al., Light confinement and high current density in UVB laser diode structure using Al composition-graded p-AlGaN cladding layer, Applied Physics Letters, May 16, 2019, pp. 191103-1 to 191103-5, vol. 114.

Mar. 15, 2022, International Preliminary Report on Patentability issued in the International Patent Application No. PCT/JP2020/036467.

* cited by examiner

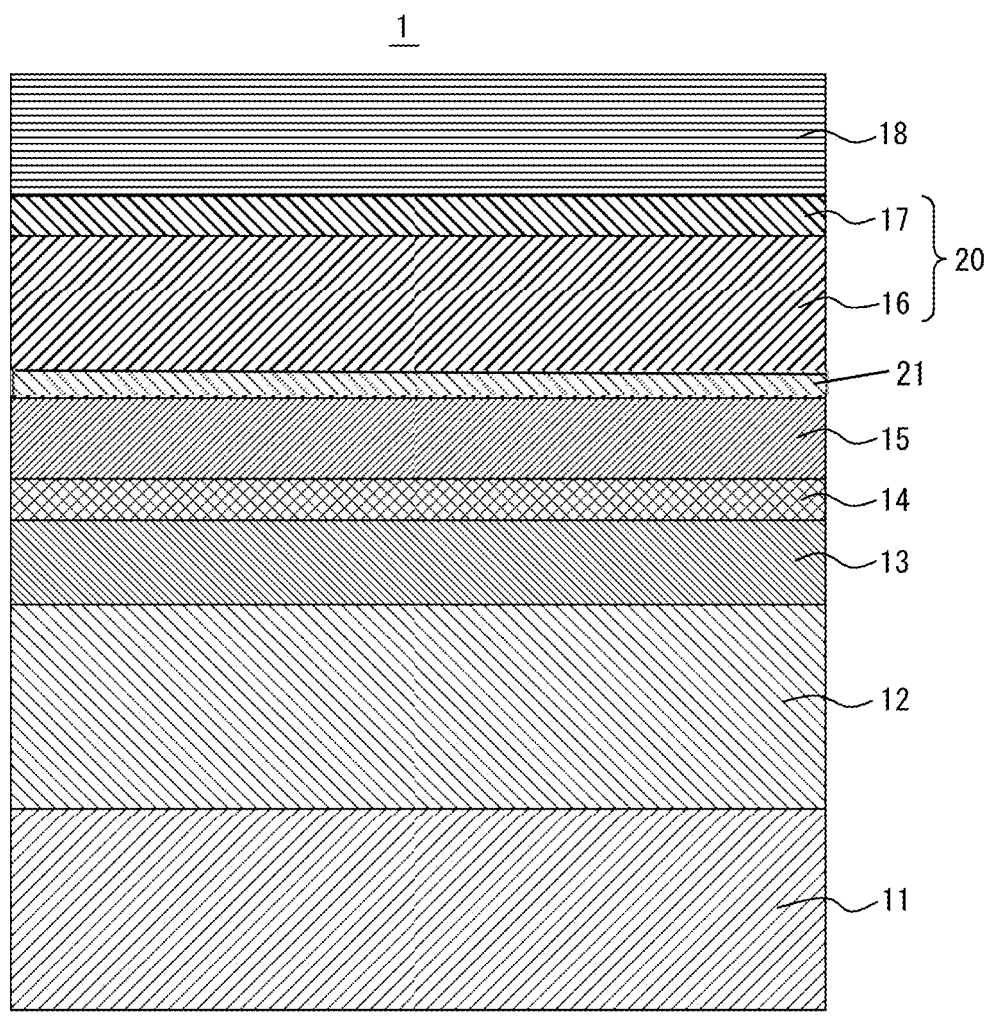

LASER DIODE

CROSS-REFERENCE TO RELATED APPLICATION

The present application claims priority to Japanese Patent Application No. 2019-177788 filed on Sep. 27, 2019, the entire contents of which are incorporated herein by reference.

TECHNICAL FIELD

The present disclosure relates to a laser diode.

BACKGROUND

Nitride semiconductors that include Al and Ga are suitable as materials for laser diodes by virtue of achieving high recombination efficiency and high optical gain due to their direct transition recombination form. In particular, in an $Al_xGa_{1-x}N$ mixed-crystal system with a high Al composition to obtain an emission wavelength in the ultraviolet region with a wavelength of 300 nm or less, the emission efficiency, lifetime, and optical gain of the laser diode strongly depend on the crystal defect density. By growing $Al_xGa_{1-x}N$ mixed crystals on an AlN single crystal substrate, which has been introduced in recent years, a good nitride semiconductor with a reduced defect density can be obtained. This may significantly improve the characteristics of laser diodes. However, in a high Al composition $Al_xGa_{1-x}N$ mixed-crystal system, it is difficult to obtain p-type conductivity in bulk $Al_xGa_{1-x}N$ mixed crystals by impurity doping. In this regard, Patent Literature (PTL) 1, for example, discloses a technique for using a composition gradient layer to improve the carrier injection efficiency.

CITATION LIST

Patent Literature

PTL 1: JP 2018-532265 A

SUMMARY

Technical Problem

Here, the composition gradient layer including the above-described compositional discontinuity has a large ratio (transverse to longitudinal resistivity ratio) of the electrical resistivity (transverse resistivity) in the in-plane direction to the electrical resistivity (longitudinal resistivity) in the vertical direction. The vertical direction corresponds to the stacking direction of the layers in the laser diode. The in-plane direction is the direction along the surface of one layer perpendicular to the vertical direction. In a laser diode, a high longitudinal conductivity and a low transverse to longitudinal resistivity ratio are simultaneously required for the cladding layer (particularly the p-type cladding layer) in that injection of a high current density is required uniformly over the electrode region. At the same time, the cladding layer is required not to have increased internal loss due to the optical mode being absorbed into the electrodes.

The present disclosure aims to provide a laser diode capable of achieving a high longitudinal conductivity and a low transverse to longitudinal resistivity ratio and of suppressing an increase in internal loss.

Solution to Problem

A laser diode according to the present disclosure includes an AlN single crystal substrate; an n-type cladding layer formed on the substrate and including a nitride semiconductor layer having n-type conductivity; a light-emitting layer formed on the n-type cladding layer and including one or more quantum wells; a p-type cladding layer formed on the light-emitting layer and including a nitride semiconductor layer having p-type conductivity; and a p-type contact layer formed on the p-type cladding layer and including a nitride semiconductor that includes GaN. The p-type cladding layer includes a p-type longitudinal conduction layer that includes $Al_sGa_{1-s}N$ ($0.3 \leq s \leq 1$), has a composition gradient such that an Al composition s decreases with increased distance from the substrate, and has a film thickness of less than 0.5 μm; and a p-type transverse conduction layer that includes $Al_tGa_{1-t}N$ ($0 < t \leq 1$). Here, the term "on" in the expression "an n-type cladding layer formed on the substrate and including a nitride semiconductor layer having n-type conductivity" means that the n-type cladding layer is formed above the substrate, but also includes the case of a different layer additionally being present between the substrate and the n-type cladding layer. The term "on" also has the same meaning with respect to the relationships between other layers.

Advantageous Effect

According to the present disclosure, a laser diode capable of achieving a high longitudinal conductivity and a low transverse to longitudinal resistivity ratio and of suppressing an increase in internal loss can be provided.

BRIEF DESCRIPTION OF THE DRAWINGS

In the accompanying drawings:
FIG. 1 is a cross-sectional view illustrating the configuration of a laser diode according to an embodiment.

DETAILED DESCRIPTION

<Configuration of Laser Diode>
As illustrated in FIG. 1, the laser diode 1 of the present embodiment includes a substrate 11, an n-type cladding layer 12, an n-type waveguide layer 13, a light-emitting layer 14, a p-type waveguide layer 15, a p-type cladding layer 20, and a p-type contact layer 18. The p-type cladding layer 20 has a p-type longitudinal conduction layer 16, and a p-type transverse conduction layer 17. To inject holes into the light-emitting layer 14, the laser diode 1 includes a p-type longitudinal conduction layer 16 that includes $Al_sGa_{1-s}N$ with an Al composition s graded to decrease with increased distance from the upper surface of the substrate 11, and a p-type transverse conduction layer 17 that includes $Al_tGa_{1-t}N$ (minimum value of t>s) on a surface adjacent to the p-type longitudinal conduction layer 16. Here, the minimum value of s refers to the smallest value of s that can be taken by the p-type longitudinal conduction layer 16 that includes $Al_sGa_{1-s}N$ ($0.3 \leq s \leq 1$) having a composition gradient. A p-type longitudinal conduction layer 16 that includes $Al_sGa_{1-s}$ with a gradient such that the Al composition s decreases with increased distance from the substrate 11 can acquire p-type conductivity. The gradient of the Al composition s generates an internal electric field in the direction of the upper surface (i.e., the vertical direction) of the substrate 11. The p-type longitudinal conduction layer 16 therefore has longitudinal conductivity superior to that of an $Al_sGa_{1-s}$ mixed crystal that includes a single Al composition s and is suitable for the laser diode 1. On the other hand, since the transverse resistivity in the layer having an Al composition with a gradient is much higher than the longitudinal resistivity, the transverse to longitudinal resistivity ratio tends to be larger. Here, the upper surface of the substrate 11 refers to the interface with the located layer directly above (the n-type cladding layer 12 in the example of FIG. 1) among the layers stacked on the substrate 11.

(Substrate)

The substrate 11 preferably has a low in-plane dislocation density and is such that a nitride semiconductor that includes Al and Ga can be grown on the upper surface of the substrate 11. One embodiment in which the effect of the present disclosure can be maximized is a good quality layer with an in-plane dislocation density of $5 \times 10^4$ cm$^{-2}$ or less among the various layers of the laser diode 1. In particular, in crystals having an in-plane dislocation density of $5 \times 10^4$ cm$^{-2}$ or less, the carrier scattering caused by dislocations is reduced, causing the longitudinal resistivity to decrease. This further tends to reduce the transverse to longitudinal resistivity ratio. Therefore, the substrate 11 is required to have a defect density (e.g., $1 \times 10^3$ cm$^2$ to $1 \times 10^4$ cm$^2$) that is even lower than the aforementioned defect density. Among various substrates 11, a substrate 11 that can obtain an $Al_xGa_{1-x}N$ mixed crystal having a defect density of $1 \times 10^4$ cm$^{-2}$ or less on an AlN single crystal substrate 11 is preferred, but this example is not limiting. The threading dislocation density of the substrate 11 can, for example, be measured using etch pit density measurement after performance of KOH—NaOH eutectic etching at 450° C. for 5 minutes.

The substrate 11 includes, consists essentially of, or is composed of different materials (such as SiC, Si, MgO, $Ga_2O_3$, alumina, ZnO, GaN, InN, and/or sapphire), on which an $Al_uGa_{1-u}N$ material ($0 \leq u \leq 1.0$) may be formed, for example by epitaxial growth. Such a material may be substantially fully lattice relaxed and have a thickness of, for example, at least 1 μm. The substrate 11 can be covered with a homoepitaxial layer including, consisting essentially of, or composed of the same material present in or on the substrate 11, for example AlN.

Apart from N, the substrate 11 may have impurities such as group V elements other than N, e.g. P, As, or Sb, or H, C, O, F, Mg, Si, and the like mixed therein for purposes such as obtaining conductivity, but these elements are not limiting.

The laser diode 1 according to the present disclosure can be formed on a surface that is preferably, though not limited to, a (0001) surface or a surface inclined at some angle (such as −4° to 4°, preferably −0.4° to 0.4°) from the (0001) surface normal direction.

The various layers of a multilayer film structure on the substrate 11 can be formed by any of a wide variety of different techniques, such as metal organic chemical vapor deposition (MOCVD), deposition methods such as halide vapor phase epitaxy (HYPE), epitaxial growth techniques such as molecular beam epitaxy (MBE), and the like.

(P-Type Cladding Layer)

The p-type cladding layer 20 includes a nitride semiconductor layer having p-type conductivity. The p-type cladding layer 20 is preferably completely strained with respect to the substrate 11. A layer of the laser diode 1 formed in completely strained can suppress an increase in the threading dislocation density, thereby maximizing the effects of the present disclosure. The phrase "completely strained with respect to the substrate 11" means that the layer forming part of the multilayer film has an extremely small strain relaxation with respect to the substrate 11, with a lattice relaxation rate of 5% or less. The lattice relaxation rate can be specified by the reciprocal lattice coordinates of the diffraction peaks of the substrate 11 and the reciprocal lattice coordinates of the diffraction peaks of any of the asymmetric planes, such as the (105), (114) or (205) planes, for which sufficient diffraction intensity can be obtained by X-ray diffraction measurement of the asymmetric plane.

(P-Type Longitudinal Conduction Layer)

The p-type longitudinal conduction layer 16 is a layer including $Al_sGa_{1-s}N$ with a gradient such that the Al composition s decreases in a direction away from the upper surface of the substrate 11 for the purpose of obtaining p-type conductivity. The film thickness and Al composition s range of the p-type longitudinal conduction layer 16 are components of a band gap that does not absorb light of the desired emission wavelength, and the Al composition and film thickness may be limited for the purpose of increasing the overlap between the electric field intensity distribution of the light mode, which is stationary in the device, and the light-emitting layer 14 (i.e., to increase light confinement). When the emission wavelength of the light-emitting layer 14 is 210 nm or more and 300 nm or less, then a layer including $Al_sGa_{1-s}N$ such that the Al composition s decreases in a direction away from the upper surface of the substrate 11 in a range of 0.3 or more and 1.0 or less, for example, is preferably used, and the film thickness is preferably 250 nm or more and 450 nm or less, more preferably 300 nm or more and 400 nm or less. By appropriate control of the film thickness, the internal loss of the laser diode 1 can be reduced.

From the perspective of proper light confinement and p-type cladding layer formation under complete strain, it may be preferable for the Al composition s of the p-type longitudinal conduction layer to be greater than 0.35 and 1.0 or less.

The internal loss of the laser diode 1 can, for example, be measured by a known method such as the Variable Stripe Length Method (VSLM).

The p-type longitudinal conduction layer 16 need not have a uniform amount of change in the Al composition with respect to the film thickness. For purposes such as increasing light confinement, a configuration such that the amount of change in the Al composition decreases asymptotically or stepwise upon approaching the light-emitting layer 14 can be adopted.

For reasons such as suppressing the diffusion of impurities, the p-type longitudinal conduction layer 16 preferably does not have impurities such as H, Mg, Be, Zn, Si, or B mixed therein in a region close to the p-type waveguide layer 15, i.e., the p-type longitudinal conduction layer 16 is preferably in an undoped state. Here, the term "undoped" means that the above elements are not intentionally supplied as elements in the process of forming the target layer. This is not the case if elements in the range of $10^{16}$ cm$^{-3}$ or less, for example, originating from raw materials or manufacturing equipment are mixed in. The amount of an element that has been mixed in can be specified by a technique such as secondary electron ion mass spectrometry. The term "undoped" in the present application has essentially the same meaning. The region of the p-type longitudinal conduction layer 16 to be in an undoped state includes at least the boundary with the p-type waveguide layer 15. The size of this region is not limited. For example, the entire region of the p-type longitudinal conduction layer 16 may be in the undoped state. As another example, 50% of the p-type longitudinal conduction layer 16 in a region closer to the p-type waveguide layer 15 than to the p-type transverse conduction layer 17 may be in an undoped state. As another example, approximately 10% of the p-type longitudinal conduction layer 16 in a region close to the p-type waveguide layer 15 may be in an undoped state.

Between the p-type longitudinal conduction layer 16 and the p-type waveguide layer 15, an intermediate layer 21 including $Al_vGa_{1-v}N$ ($0<v\leq1.0$), such that the Al composition v increases in the direction away from the upper surface of the substrate 11, can be provided for purposes such as improving the conductivity and/or forming the p-type transverse conduction layer 17 and the p-type contact layer 18 with complete strain. The intermediate layer 21 between the p-type longitudinal conduction layer 16 and the p-type waveguide layer 15 may be a mixed crystal serving as a band gap that does not absorb light of a desired emission wavelength. Furthermore, the intermediate layer 21 preferably has a film thickness of 50 nm or less and may be undoped.

The longitudinal resistivity of the p-type longitudinal conduction layer 16 can be calculated by, for example, using the resistance value Rs' calculated as Rs'=Rs−Rn by subtracting the resistance Rn contributed by the n-type cladding layer 12 from the series resistance Rs of the laser diode 1 in an embodiment of the present application. From the area A of the p-type electrode in contact with the p-type contact layer 18 of the laser diode 1 and the film thickness T of the p-type cladding layer 20, the longitudinal resistivity of the p-type cladding layer 20 can be calculated as Rs'×A/T. The resistance value R of the n-type cladding layer 12 can be determined by, for example, a transmission line measurement method or non-contact resistance measurement using eddy current.

(P-Type Transverse Conduction Layer)

The p-type transverse conduction layer 17 can be thin to facilitate quantum transmission of carriers that pass through the p-type transverse conduction layer 17. For example, the film thickness is 20 nm or less or 10 nm or less, preferably 5 nm or less.

Impurities such as H, Mg, Be, Zn, Si, or B can be intentionally mixed into the p-type transverse conduction layer 17 for purposes such as controlling the longitudinal resistivity of the p-type transverse conduction layer 17. As an example, the amount of the impurities to be mixed in may be between $1\times10^{18}$ cm$^{-3}$ and $5\times10^{21}$ cm$^{-3}$, depending on the amount of the net electric field induced on the surface and inside of the p-type transverse conduction layer 17. The amount of impurities mixed in may also be between $1\times10^{19}$ cm$^{-3}$ and $5\times10^{21}$ cm$^{-3}$.

The Al composition of the p-type transverse conduction layer 17 at the interface with the p-type contact layer 18 is preferably in the range of 0.9 or more to 1.0 or less, and complete strain with respect to the substrate 11 is preferably achieved. In such a p-type transverse conduction layer 17, the net internal electric field generated on the surface and on the inside near the surface of the p-type transverse conduction layer 17 becomes negative, inducing holes and thereby having the effect of improving the transverse conductivity. The distribution of the Al composition of the p-type transverse conduction layer 17 in the region of the laser diode 1 is preferably limited to 5% or less. Such a p-type transverse conduction layer 17 can achieve a higher transverse conductivity by virtue of reduced carrier scattering due to the distribution of the composition.

The p-type transverse conduction layer 17 is preferably formed to be $Al_tGa_{1-t}N$ with an Al composition t of $0.9\leq t\leq1.0$ by holding $Al_yGa_{1-y}N$, which includes an Al composition y smaller than the Al composition t of the final p-type transverse conduction layer 17, in a high temperature state such that the Al and Ga raw materials are not supplied.

(N-Type Cladding Layer)

The n-type cladding layer 12 includes a nitride semiconductor layer having n-type conductivity. The n-type cladding layer 12 is preferably formed to be completely strained relative to the substrate 11. For the purpose of forming n-type cladding layer 12 to be completely strained relative to the substrate 11, an intermediate layer of uniformly varying Al composition can be present at the interface between n-type cladding layer 12 and the substrate 11, and Al composition and film thickness of the n-type cladding layer 12 may be restricted. The Al composition of the n-type cladding layer 12 may be limited for the purpose of obtaining a low contact resistance with respect to a suitable electrode (e.g. $1\times10^{-6}$ Ωcm$^2$ to $1\times10^{-3}$ Ωcm$^2$, preferably $1\times10^{-6}$ Ωcm$^2$ to $1\times10^{-4}$ cm$^2$). As an embodiment of the n-type cladding layer 12 in view of the above limitations, the Al composition may be from 0.6 to 0.8, and the thickness may be from 0.3 μm to 0.5 μm.

The n-type cladding layer 12 may be a graded layer such that the Al composition increases in a direction away from the substrate 11 for purposes such as controlling the longitudinal conductivity thereof. In this case, the aforementioned limitation on the Al composition can be similarly embodied as an Al composition yielded by averaging the Al composition at each position in the film thickness direction in the n-type cladding layer over the film thickness of the n-type cladding layer 12.

Apart from N, the n-type cladding layer 12 may have impurities such as group V elements other than N, e.g. P, As, or Sb, or H, C, O, F, Mg, Ge, Si, and the like mixed therein for purposes such as controlling the longitudinal conductivity of the layer, but these elements are not limiting. The appropriate amount of impurities that are mixed in is limited by the Al composition of the n-type cladding layer 12. The amount is preferably $1\times10^{19}$ cm$^{-3}$ to $1\times10^{20}$ cm$^{-3}$.

(Waveguide Layer)

The waveguide layer is a nitride semiconductor that includes Al and Ga having a band gap that does not absorb light of the desired emission wavelength, and the Al composition and film thickness may be limited for the purpose of increasing the overlap between the electric field intensity distribution of light, which is stationary in the device, and the light emitting layer 14. For example, for a light-emitting layer 14 of 260 nm to 280 nm, the Al composition is preferably 0.55 to 0.65, and the film thickness is preferably 70 nm to 150 nm.

The waveguide layer can be configured by two layers: a portion (n-type waveguide layer 13) on the n-type cladding layer 12 side of the light-emitting layer 14, and a portion (p-type waveguide layer 15) on the p-type cladding layer 20 side of the light-emitting layer 14. That is, the n-type waveguide layer 13 is formed between the n-type cladding layer 12 and the light-emitting layer 14. The p-type waveguide layer 15 can be formed between the p-type cladding layer 20 and the light-emitting layer 14. The film thickness ratio of the n-type waveguide layer 13 and the p-type waveguide layer 15 can take various values according to the light confinement to the light-emitting layer 14 and the Al composition of the n-type cladding layer 12 and the p-type cladding layer 20. The Al composition of the n-type waveguide layer 13 and the p-type waveguide layer 15 is preferably, but not necessarily, uniform in the film thickness direction. The Al composition of the p-type waveguide layer 15 may be higher than the Al composition of the n-type waveguide layer 13 to avoid light absorption into the metal present on the p-type contacts. For the same reason, the film thickness of the p-type waveguide layer 15 may be greater than the film thickness of the n-type waveguide. Apart from N, the n-type waveguide layer 13 may have impurities such as group V elements other than N, e.g. P, As, or Sb, or H, C, O, F, Mg, Si, and the like mixed therein for purposes such as obtaining the same conductivity as the n-type cladding layer 12, but these elements are not limiting.

A composition gradient layer including $Al_wGa_{1-w}N$, such that the Al composition w decreases in the direction away from the upper surface of the substrate 11, can be provided between the n-type waveguide layer 13 and the n-type cladding layer 12 for purposes such as improving the longitudinal conductivity. The intermediate layer between the n-type waveguide layer 13 and the n-type cladding layer 12 preferably has a film thickness of 10 nm or less.

A composition graded layer including $Al_xGa_{1-x}N$, such that the Al composition x increases in the direction away from the upper surface of the substrate 11, can be provided between the p-type waveguide layer 15 and the p-type cladding layer 20 for purposes such as improving the longitudinal conductivity. The intermediate layer 21 between the p-type waveguide layer 15 and the p-type cladding layer 20 preferably has a film thickness that is sufficiently small (for example, 30 nm or less, or 20 nm or less) so as not to degrade the light confinement to the waveguide layer.

An electron blocking layer having a band gap larger than that of the p-type waveguide layer 15 can be provided inside the p-type waveguide layer 15, between the p-type waveguide layer 15 and the light-emitting layer 14, between the p-type waveguide layer 15 and the p-type longitudinal conduction layer 16, or in a portion of the p-type waveguide layer 15. The electron blocking layer can be 30 nm or less, or can be 20 nm or less, more preferably 15 nm or less, to facilitate quantum penetration of holes into the electron blocking layer.

(Light-Emitting Layer)

The light-emitting layer 14 can have a single or multiple quantum wells sandwiched between the n-type waveguide layer 13 and the p-type waveguide layer 15. The number of quantum wells can be 3 or 2 or 1, depending on the longitudinal conductivity of the n-type cladding and the p-type cladding.

For purposes such as reducing the effect of crystal defects in the light-emitting layer 14, some or all of the light-emitting layer 14 may intentionally have $1 \times 10^{-15}$ cm$^{-3}$ or more of elements such as Si, Sb, P, or the like mixed therein.

(P-Type Contact Layer)

The p-type contact layer 18 may be formed on the p-type cladding layer 20 and be a nitride semiconductor that includes GaN. Apart from N, the p-type contact layer 18 may have impurities such as group V elements other than N, e.g. P, As, or Sb, or H, C, O, F, Mg, Ge, Si, and the like mixed therein for purposes such as reducing the contact resistance, but these elements are not limiting. For example, $1 \times 10^{20}$ cm$^{-3}$ to $1 \times 10^{22}$ cm$^{-3}$ of Mg can be mixed in.

Electrical contact to the laser diode 1 of the present disclosure can be made by an electrode layer disposed on the p-type contact layer 18 and by an electrode layer disposed in contact with the n-type cladding layer 12. For example, an electrode layer can be disposed on the back side of the substrate 11. Alternatively, in one or more regions near the p-type contact layer 18, various upper layers of the laser diode 1 can be removed by chemical etching or dry etching, for example, to expose the n-type cladding layer 12, and an electrode can be disposed on the exposed n-type cladding layer 12.

(Electrode Layer)

The electrode layer disposed on the p-type contact layer 18 may be a metal that includes Ni, Pt, Au, B, and/or Pd.

The n-type cladding layer 12 or the electrode layer disposed on the back surface of the substrate 11 can be a metal that includes V, Al, Au, Ti, Ni, and/or Mo. The metal layer in contact with the substrate 11 is preferably a metal that includes V or Ti.

EXAMPLES

The laser diode 1 of Examples 1 to 4 was produced to have the same layer structure as the laser diode 1 of the above embodiment. Examples 5 and 6, Comparative Examples 1 and 2, and Reference Examples 1 to 5 are also illustrated below.

Example 1

As Example 1, the nitride semiconductor laser diode 1 illustrated below was produced. MOCVD was used to produce the laser diode 1, and trimethylgallium (TMG), triethylgallium (TEG), trimethylaluminum (TMA), ammonia ($NH_3$), silane ($SiH_4$), and biscyclopentadienyl magnesium ($Cp_2Mg$) were used as raw materials. A 0.2 μm homoepitaxial layer that includes AlN was formed by reacting TMA and $NH_3$ in an $H_2$ atmosphere at 1200° C. on a surface inclined at 0.1° to 0.3° relative to the [0001] plane of an AlN single crystal substrate 11.

An AlGaN interlayer having a film thickness of 30 nm and an Al composition uniformly decreasing from 1.0 to 0.7 in the direction away from the upper surface of the substrate 11, and an n-type cladding layer 12 of $Al_{0.7}Ga_{0.3}N$ having a film thickness of 0.35 μm and doped with $5 \times 10^{19}$ cm$^{-3}$ of Si were stacked in this order on a homoepitaxial layer including AlN by reacting TMA, TMG, $NH_3$ and $SiH_4$ in an $H_2$ atmosphere at 1055° C. The AlN homoepitaxial layer, the intermediate layer, and the n-type cladding layer 12 were formed to be completely strained with respect to the substrate 11 by being formed at a rate of 0.3 μm/h to 0.6 μm/h.

An n-type waveguide layer 13 having a film thickness of 60 nm and including $Al_{0.63}Ga_{0.37}N$, and a light-emitting layer 14 including a multilayer quantum well layer having a total thickness of 30 nm, were stacked in this order on the n-type cladding layer 12 by reacting TMA, TMG, and $NH_3$ in an $H_2$ atmosphere at 1055° C. During the formation of a portion of a barrier layer of the light-emitting layer 14, the light-emitting layer was doped with $3 \times 10^{19}$ cm$^{-3}$ of Si by the introduction of $SiH_4$ as a raw material. Furthermore, a p-type waveguide layer 15 having a film thickness of 50 nm and including $Al_{0.62}Ga_{0.38}N$ was formed on the light-emitting layer 14. The n-type waveguide layer 13, the light-emitting layer 14, and the p-type waveguide layer 15 were formed to be completely strained with respect to the substrate 11 by being formed at a rate of 0.4 μm/h.

An AlGaN intermediate layer 21 having a film thickness of 20 nm and an Al composition uniformly increasing from 0.62 to 1.0 in the direction away from the upper surface of the substrate 11, and a p-type longitudinal conduction layer 16 having a film thickness of 0.32 μm and an Al composition decreasing from 1.0 to 0.3 in the direction away from the upper surface of the substrate 11, were stacked in this order on the p-type waveguide layer 15 by reacting TMA, TMG, and $NH_3$ in an $H_2$ atmosphere at 1055° C. The p-type longitudinal conduction layer 16 was formed to be completely strained with respect to the substrate 11 by being formed at a rate of 0.3 μm/h to 0.5 μm/h. The entire region of the p-type longitudinal conduction layer 16 was in an undoped state.

A p-type transverse conduction layer 17 having a film thickness of 3 nm and including $Al_{0.45}Ga_{0.05}N$ was formed on the p-type longitudinal conduction layer 16. Furthermore, the supply of TMA and TMG materials was stopped at 1055° C., and a state in which only $Cp_2Mg$ was supplied was maintained (annealing) for 10 minutes or longer to transform the p-type transverse conduction layer 17 into an $Al_{0.97}Ga_{0.03}N$ layer doped with $1×10^{20}$ $cm^{−3}$ of Mg. By this transformation procedure, the p-type transverse conduction layer 17 was formed to be completely strained with respect to the substrate 11.

XRD measurement of the (002) plane indicated that the dispersion of the Al composition of the p-type transverse conduction layer 17 was 3.5% in the region corresponding to the region of the laser diode 1. Confirmation of the atomic arrangement using transmission images in the <11-20> direction of a transmission electron microscope at several positions revealed that the p-type transverse conduction layer 17 was completely strained with respect to the substrate 11.

A p-type contact layer 18 having a film thickness of 20 nm and including GaN doped with $5×10^{20}$ $cm^{−3}$ of Mg was formed on the p-type transverse conduction layer 17 by reacting TMG, $Cp_2Mg$, and $NH_3$ in an $H_2$ atmosphere at 940° C.

In the nitride semiconductor laser diode 1 produced as described above, the resistance of the p-type layer was further reduced by annealing at 700° C. for 10 minutes or longer in an $N_2$ atmosphere. By dry etching with a gas including $Cl_2$, the n-type cladding layer 12 was exposed within a rectangular region parallel to the <11-20> direction and elongated in the <11-20> direction. Furthermore, a passivation layer including $SiO_2$ was formed on the surface of the nitride semiconductor laser diode 1.

A plurality of rectangular electrode metal regions (p-type electrodes), including Ni or Au, parallel to the <11-20> direction and elongated in the <11-20> direction, were formed on the p-type contact layer 18. A plurality of rectangular electrode metals (n-type electrodes), including V, Al, Ni, Ti, or Au, parallel to the <11-20> direction and elongated in the <11-20> direction, were formed in the region where the n-type cladding layer 12 was exposed. Furthermore, within the electrode metal region, the substrate 11 was divided into stripes by cleaving multiple times parallel to the <1-100> direction.

Resonators of length Y μm (Y=50, 100, 150, 200, 250, 300, 350, 400 μm) were formed with a plurality of natural cleavage planes parallel to the <1-100> direction as the end faces, and with the long edges perpendicular to the cleavage direction. Using these resonators with different lengths Y μm, the excitation length dependence was obtained with rectangular laser spots 500 μm long by 15 μm wide. Calculation based on VSLM indicated that the internal loss was 10 $cm^{−1}$.

For the laser diode 1 produced as described above, the overall series resistance of the laser diode 1 was measured by evaluating the diode characteristics under forward bias using the nearest p-type and n-type electrodes. Furthermore, by measuring the resistance between a plurality of n-type electrodes based on the TLM method, the longitudinal and transverse resistivities of the n-type cladding layer 12 were obtained. Since the n-type cladding layer 12 is a homogeneous mixed crystal, the longitudinal and transverse resistivities match. From the above measured data, the longitudinal conductivity of the p-type cladding layer 20 was calculated to be 0.13 $Ω^{−1}$ $cm^{−1}$. Furthermore, by measuring the resistance between a plurality of p-type electrodes based on the TLM method, the transverse resistivity of the p-type cladding layer 20 was obtained. The transverse to longitudinal resistivity ratio of the p-type cladding layer 20 was 1.5.

The lattice relaxation rates calculated from the XRD diffraction intensity peaks at the (205) plane of the substrate 11 and XRD diffraction intensity peaks at the (205) plane of each film of the laser diode 1 produced as described above were all less than 4%.

Example 2

A laser diode 1 was produced by a similar procedure to the procedure of Example 1, except that the film thickness of the p-type longitudinal conduction layer 16 was set to 0.21 μm.

For the laser diode 1 produced as described above, the lattice relaxation rate calculated by the method described in Example 1 was 4% or less.

The longitudinal conductivity of the p-type cladding layer 20 was 0.17 $Ω^{−1}$ $cm^{−1}$ as calculated by the method described in Example 1. The transverse to longitudinal resistivity ratio of the p-type cladding layer 20 was 1.9 as calculated by the method described in Example 1. The internal loss by VSLM was 20 $cm^{−1}$ as measured by the method described in Example 1.

Example 3

A laser diode 1 was produced by a similar procedure to the procedure of Example 1, except that the film thickness of the p-type longitudinal conduction layer 16 was set to 0.25 μm.

For the laser diode 1 produced as described above, the lattice relaxation rates calculated by the method described in Example 1 were all 4% or less.

The longitudinal conductivity of the p-type cladding layer 20 was 0.15 $Ω^{−1}$ $cm^{−1}$ as calculated by the method described in Example 1. The transverse to longitudinal resistivity ratio of the p-type cladding layer 20 was 1.9 as calculated by the method described in Example 1. The internal loss by VSLM was 15 $cm^{−1}$ as measured by the method described in Example 1.

Example 4

A laser diode 1 was produced by a similar procedure to the procedure of Example 1, except that the film thickness of the p-type longitudinal conduction layer 16 was set to 0.45 μm.

For the laser diode 1 produced as described above, the lattice relaxation rates calculated by the method described in Example 1 were all 4% or less.

The longitudinal conductivity of the p-type cladding layer 20 was 0.11 $Ω^{−1}$ $cm^{−1}$ as calculated by the method described in Example 1. The transverse to longitudinal resistivity ratio of the p-type cladding layer 20 was 1.4 as calculated by the method described in Example 1. The internal loss by VSLM was 9 $cm^{−1}$ as measured by the method described in Example 1.

Example 5

A laser diode 1 was produced by a similar procedure to the procedure of Example 1, except for the procedure to produce a p-type transverse conduction layer 17, described below.

A p-type transverse conduction layer 17 having a film thickness of 3 nm and including $Al_{0.97}Ga_{0.03}N$ doped with $3\times10^{20}$ cm$^{-3}$ of Mg, in a manner similar to the various layers of the laser diode 1, was formed on the p-type longitudinal conduction layer 16 by reacting TMA, TMG, Cp$_2$Mg, and NH$_3$ in an H$_2$ atmosphere at 940° C.

For the laser diode 1 produced as described above, the lattice relaxation rates calculated by the method described in Example 1 were all 4% or less.

The longitudinal conductivity of the p-type cladding layer 20 was 0.13 $\Omega^{-1}$ cm$^{-1}$ as calculated by the method described in Example 1. The transverse to longitudinal resistivity ratio of the p-type cladding layer 20 was 2.9 as calculated by the method described in Example 1. The internal loss by VSLM was 11 cm$^{-1}$ as measured by the method described in Example 1.

Example 6

A laser diode 1 was produced by a similar procedure to the procedure of Example 1, except that the Mg concentration in the p-type transverse conduction layer 17 was set to $1\times10^{16}$ cm$^{-3}$.

For the laser diode 1 produced as described above, the lattice relaxation rates calculated by the method described in Example 1 were all 4% or less.

The longitudinal conductivity of the p-type cladding layer 20 was 0.11 $\Omega^{-1}$cm$^{-1}$ as calculated by the method described in Example 1. The transverse to longitudinal resistivity ratio of the p-type cladding layer 20 was 1.6 as calculated by the method described in Example 1. The internal loss by VSLM was 10 cm$^{-1}$ as measured by the method described in Example 1.

Comparative Example 1

A laser diode 1 identical to that of Example 1 was produced, except that the p-type longitudinal conduction layer 16 was $Al_{0.7}Ga_{0.3}N$ (no composition gradient) with a film thickness of 0.32 μm.

For the laser diode 1 produced as described above, the lattice relaxation rates calculated by the method described in Example 1 were all 4% or less.

For the laser diode 1 produced as described above, the longitudinal conductivity of the p-type cladding layer 20 was 0.06 $\Omega^{-1}$ cm$^{-1}$ as calculated by the method described in Example 1. The transverse to longitudinal resistivity ratio of the p-type cladding layer 20 was 11.3 as calculated by the method described in Example 1. The internal loss by VSLM was 31 cm$^{-1}$ as measured by the method described in Example 1.

Comparative Example 2

A laser diode 1 without a p-type transverse conduction layer 17 was produced by setting the p-type longitudinal conduction layer 16 in Example 1 to $Al_{0.7}Ga_{0.3}N$ (no composition gradient) with a film thickness of 0.32 μm, and after formation of the p-type longitudinal conduction layer 16, performing the procedures from the formation of the p-type contact layer 18 onward.

For the laser diode 1 produced as described above, the lattice relaxation rates calculated by the method described in Example 1 were all 4% or less.

For the laser diode 1 produced as described above, the longitudinal conductivity of the p-type cladding layer 20 was 0.07 $\Omega^{-1}$ cm$^{-1}$ as calculated by the method described in Example 1. The transverse to longitudinal resistivity ratio of the p-type cladding layer 20 was 16.4 as calculated by the method described in Example 1. The internal loss by VSLM was 31 cm$^{-1}$ as measured by the method described in Example 1.

Reference Example 1

A laser diode 1 without a p-type transverse conduction layer 17 was produced by performing a similar procedure as in Example 1 through production of the p-type longitudinal conduction layer 16, and then performing the procedure from the formation of the p-type contact layer 18 onwards.

For the laser diode 1 produced as described above, the lattice relaxation rates calculated by the method described in Example 1 were all 4% or less.

For the laser diode 1 produced as described above, the longitudinal conductivity of the p-type cladding layer 20 was 0.14 $\Omega^{-1}$ cm$^{-1}$ as calculated by the method described in Example 1. The transverse to longitudinal resistivity ratio of the p-type cladding layer 20 was 26.7 as calculated by the method described in Example 1. The internal loss by VSLM was 10 cm$^{-1}$ as measured by the method described in Example 1.

Reference Example 2

To relax the laser diode structure intentionally, a laser diode 1 was produced by a similar procedure to the procedure of Example 1, except that the film thickness of the p-type longitudinal conduction layer 16 was set to 0.8 μm.

For the laser diode 1 produced as described above, the lattice relaxation rates calculated by the method described in Example 1 were all 30%.

For the laser diode 1 produced as described above, the longitudinal conductivity of the p-type cladding layer 20 was 0.02 $\Omega^{-1}$ cm$^{-1}$ as calculated by the method described in Example 1. The transverse to longitudinal resistivity ratio of the p-type cladding layer 20 was 6.1 as calculated by the method described in Example 1. The internal loss by VSLM was 17 cm$^{-1}$ as measured by the method described in Example 1.

Reference Example 3

A laser diode 1 was produced by a similar procedure to the procedure of Example 1, except that the film thickness of the p-type longitudinal conduction layer 16 was set to 0.5 μm.

For the laser diode 1 produced as described above, the lattice relaxation rates calculated by the method described in Example 1 were all 20%.

For the laser diode 1 produced as described above, the longitudinal conductivity of the p-type cladding layer 20 was 0.04 $\Omega^{-1}$ cm$^{-1}$ as calculated by the method described in Example 1. The transverse to longitudinal resistivity ratio of the p-type cladding layer 20 was 9.7 as calculated by the method described in Example 1. The internal loss by VSLM was 8 cm$^{-1}$ as measured by the method described in Example 1.

Reference Example 4

A laser diode 1 was produced by the same procedure as in Example 1, except that the p-type longitudinal conduction layer 16 had a thickness of 0.32 μm and was stacked so that the Al composition decreased from 1.0 to 0.1 in the direction away from the upper surface of the substrate 11.

For the laser diode 1 produced as described above, the lattice relaxation rates calculated by the method described in Example 1 were all 4% or less.

For the laser diode 1 produced as described above, the longitudinal conductivity of the p-type cladding layer 20 was 0.13 $\Omega^{-1}$ cm$^{-1}$ as calculated by the method described in Example 1. The transverse to longitudinal resistivity ratio of the p-type cladding layer 20 was 1.5 as calculated by the method described in Example 1. The internal loss by VSLM was 27 cm$^{-1}$ as measured by the method described in Example 1.

Reference Example 5

A laser diode 1 was produced by the same procedure as in Example 1, except that the p-type longitudinal conduction layer 16 had a thickness of 0.32 µm and was stacked so that the Al composition decreased from 1.0 to 0.2 in the direction away from the upper surface of the substrate 11.

For the laser diode 1 produced as described above, the lattice relaxation rates calculated by the method described in Example 1 were all 4% or less.

For the laser diode 1 produced as described above, the longitudinal conductivity of the p-type cladding layer 20 was 0.13 $\Omega^{-1}$ cm$^{-1}$ as calculated by the method described in Example 1. The transverse to longitudinal resistivity ratio of the p-type cladding layer 20 was 1.5 as calculated by the method described in Example 1. The internal loss by VSLM was 19 cm$^{-1}$ as measured by the method described in Example 1.

The above-described configurations, manufacturing conditions, and evaluation results for the laser diodes 1 of Examples 1 to 6, Comparative Examples 1, 2, and Reference Examples 1 to 5 are summarized in Table 1 below.

(Comparison)

The laser diodes 1 of Examples 1 to 6 have a longitudinal conductivity of 0.11 or more and 0.17 or less, a transverse to longitudinal resistivity ratio of 1.5 or more and 2.9 or less, and an internal loss of 9 cm$^{-1}$ or more and 20 cm$^{-1}$ or less. The laser diodes 1 of Comparative Examples 1, 2 have a longitudinal conductivity of 0.06 or more and 0.07 or less, a transverse to longitudinal resistivity ratio of 11.3 or more and 16.7 or less, and an internal loss of 31 cm$^{-1}$.

The laser diodes 1 of Comparative Examples 1, 2 have a structure that does not use a composition gradient layer as the p-type longitudinal conduction layer 16. Therefore, the longitudinal conductivity is low. Furthermore, in Comparative Example 2, the resistivity ratio is further increased with respect to Comparative Example 1 due to the absence of the p-type transverse conduction layer 17. Neither of the Comparative Examples can achieve properties that simultaneously have the low internal loss, high longitudinal conductivity, and low transverse to longitudinal resistivity ratio exhibited by the laser diode 1 of Examples 1 to 6.

Furthermore, the laser diode s1 of Reference Examples 1 to 5 will be examined. The laser diode 1 of Reference Example 1 includes a composition gradient layer as the p-type longitudinal conduction layer, as in Comparative Example 1, but has no p-type transverse conduction layer 17. The laser diode 1 of Reference Example 1 cannot achieve a low transverse to longitudinal resistivity ratio as compared with Examples 1 to 6. The laser diodes 1 of Reference Examples 2 and 3 include a composition gradient layer as the p-type longitudinal conduction layer 16, as in Comparative Example 1, but the film thickness of the p-type longitudinal conduction layer 16 is 0.5 µm or more. The laser diodes 1 of Reference Examples 2 and 3 cannot achieve

TABLE 1

| | P-type longitudinal conduction layer | | P-type transverse conduction layer | | | | Relaxation rate of p-type longitudinal conduction layer and p-type transverse conduction layer with respect to substrate | Internal loss [cm$^{-1}$] | Longitudinal conductivity [$\Omega^{-1}$ cm$^{-1}$] | Resistivity ratio (in-plane/vertical directions) |
|---|---|---|---|---|---|---|---|---|---|---|
| | Al composition gradient (max/min) | Film thickness [µm] | Al composition | Film thickness [nm] | Formation method | Mg doping concentration | | | | |
| Example 1 | 1.0/0.3 | 0.32 | 0.97 | 3 | annealing | 1 × 10$^{20}$ cm$^{-3}$ | 4% or less | 10 | 0.13 | 1.5 |
| Example 2 | 1.0/0.3 | 0.21 | 0.97 | 3 | annealing | 1 × 10$^{20}$ cm$^{-3}$ | 4% or less | 20 | 0.17 | 1.9 |
| Example 3 | 1.0/0.3 | 0.25 | 0.97 | 3 | annealing | 1 × 10$^{20}$ cm$^{-3}$ | 4% or less | 15 | 0.15 | 1.9 |
| Example 4 | 1.0/0.3 | 0.45 | 0.97 | 3 | annealing | 1 × 10$^{20}$ cm$^{-3}$ | 4% or less | 9 | 0.11 | 1.4 |
| Example 5 | 1.0/0.3 | 0.32 | 0.97 | 3 | stacking | 3 × 10$^{20}$ cm$^{-3}$ | 4% or less | 11 | 0.13 | 2.9 |
| Example 6 | 1.0/0.3 | 0.32 | 0.97 | 3 | annealing | 1 × 10$^{16}$ cm$^{-3}$ | 4% or less | 10 | 0.11 | 1.6 |
| Comparative Example 1 | 0.7/0.7 (no composition gradient) | 0.32 | 0.97 | 3 | annealing | 1 × 10$^{20}$ cm$^{-3}$ | 4% or less | 31 | 0.06 | 11.3 |
| Comparative Example 2 | 0.7/0.7 (no composition gradient) | 0.32 | — | — | N/A (no film formed) | — | 4% or less | 31 | 0.07 | 16.4 |
| Reference Example 1 | 1.0/0.3 | 0.32 | — | — | N/A (no film formed) | — | 4% or less | 10 | 0.14 | 26.7 |
| Reference Example 2 | 1.0/0.3 | 0.8 | 0.97 | 3 | annealing | 1 × 10$^{20}$ cm$^{-3}$ | 30% | 17 | 0.02 | 6.1 |
| Reference Example 3 | 1.0/0.3 | 0.5 | 0.97 | 3 | annealing | 1 × 10$^{20}$ cm$^{-3}$ | 20% | 8 | 0.04 | 9.7 |
| Reference Example 4 | 1.0/0.1 | 0.32 | 0.97 | 3 | annealing | 1 × 10$^{20}$ cm$^{-3}$ | 4% or less | 27 | 0.13 | 1.5 |
| Reference Example 5 | 1.0/0.2 | 0.32 | 0.97 | 3 | annealing | 1 × 10$^{20}$ cm$^{-3}$ | 4% or less | 19 | 0.13 | 1.5 | either a high longitudinal conductivity or a low transverse to longitudinal resistivity ratio as compared with Examples 1 to 6. The laser diodes 1 of Reference Examples 4 and 5 include a composition gradient layer as the p-type longitudinal conduction layer, but the minimum value of the Al composition is less than 0.3. The laser diodes 1 of Reference Examples 4 and 5 cannot achieve low internal loss as compared with Examples 1 to 6. The laser diodes 1 of Reference Examples 1 to 5 cannot be said to achieve properties that simultaneously have low internal loss, high longitudinal conductivity, and a low transverse to longitudinal resistivity ratio as compared with Examples 1 to 6.

Variation

As described above, each laser diode 1 of Examples 1 to 6 has low internal loss, high longitudinal conductivity, and a low transverse to longitudinal resistivity ratio at the same time. Here, to further investigate the relationship with oscillation, the oscillation state was measured using Variations in which the configuration of the quantum well layer included in the light-emitting layer 14 and the configuration of the p-type longitudinal conduction layer 16 were changed with respect to Example 1. In the production of the Variations below, first, a laser diode 1 with an electrode was cut along the <11-20> direction to form a 400 μm long laser cavity. After obtaining an atomically flat (1-100) facet by cleavage, a highly reflective coating (90% or higher reflectivity) formed by a $HfO_2/SiO_2$ multilayer film was applied to the cleaved surfaces on both sides. The electrical properties were measured at room temperature under 50 ns pulse current injection with a 0.5 ms period (duty 0.01%).

Variation 1

As Variation 1, a laser diode 1 having a similar configuration to that of Example 1 was produced, except that the light-emitting layer 14 included a single quantum well layer having a total film thickness of 7.5 nm. The laser diode 1 of Variation 1 oscillated and had an oscillation threshold of 60 $kA/cm^2$.

Variation 2

As Variation 2, a laser diode 1 having a similar configuration to that of Example 1 was produced, except that the light-emitting layer 14 included a single quantum well layer having a total film thickness of 9 nm. The laser diode 1 of Variation 2 oscillated and had an oscillation threshold of 25 $kA/cm^2$.

Variation 3

As Variation 3, a laser diode 1 having a similar configuration to that of Example 1 was produced, except that the light-emitting layer 14 included a single quantum well layer having a total film thickness of 15 nm. The laser diode 1 of Variation 3 oscillated and had an oscillation threshold of 9 $kA/cm^2$.

Variation 4

As Variation 4, a laser diode 1 having a similar configuration to that of Example 1 was produced, except that the light-emitting layer 14 included a single quantum well layer having a total film thickness of 9 nm, and a region of the p-type longitudinal conduction layer 16 from the interface with the p-type waveguide layer 15 to 10 nm in the thickness direction was in an undoped state. Here, the portion of the p-type longitudinal conduction layer 16 not in the undoped state was doped with $1.3 \times 10^{19}$ $cm^{-3}$ of Mg. Also, the film thickness of the p-type longitudinal conduction layer 16 was 0.32 μm, as in Example 1. The laser diode 1 of Variation 4 oscillated and had an oscillation threshold of 30 $kA/cm^2$.

Variation 5

As Variation 5, a laser diode 1 having a similar configuration to that of Example 1 was produced, except that the light-emitting layer 14 included a single quantum well layer having a total film thickness of 9 nm, and a region of the p-type longitudinal conduction layer 16 from the interface with the p-type waveguide layer 15 to 50 nm in the thickness direction was in an undoped state. Here, the portion of the p-type longitudinal conduction layer 16 not in the undoped state was doped with $1.3 \times 10^{19}$ $cm^{-3}$ of Mg. The laser diode 1 of Variation 5 oscillated and had an oscillation threshold of 20 $kA/cm^2$.

Variation 6

As Variation 6, a laser diode 1 having a similar configuration to that of Example 1 was produced, except that the light-emitting layer 14 included a single quantum well layer having a total film thickness of 9 nm, and a region of the p-type longitudinal conduction layer 16 from the interface with the p-type waveguide layer 15 to 100 nm in the thickness direction was in an undoped state. Here, the portion of the p-type longitudinal conduction layer 16 not in the undoped state was doped with $1.3 \times 10^{19}$ $cm^{-3}$ of Mg. The laser diode 1 of Variation 6 oscillated and had an oscillation threshold of 18 $kA/cm^2$.

The above-described configurations and evaluation results for the laser diodes 1 of Variations 1 to 6 are summarized in Table 2 below.

TABLE 2

| | Light-emitting layer | | P-type longitudinal conduction layer | | |
| --- | --- | --- | --- | --- | --- |
| | Quantum well | | | | |
| | layer film thickness [nm] | Layer structure | Undoped region thickness [nm] | Film thickness [μm] | Oscillation threshold [$kA/cm^2$] |
| Variation 1 | 7.5 | 1 layer | entire region | 0.32 | 60 |
| Variation 2 | 9.0 | 1 layer | entire region | 0.32 | 25 |
| Variation 3 | 15.0 | 1 layer | entire region | 0.32 | 9 |
| Variation 4 | 9.0 | 1 layer | 10 | 0.32 | 30 |

TABLE 2-continued

| | Light-emitting layer | | P-type longitudinal conduction layer | | |
|---|---|---|---|---|---|
| | Quantum well | | | | |
| | layer film thickness [nm] | Layer structure | Undoped region thickness [nm] | Film thickness [μm] | Oscillation threshold [kA/cm$^2$] |
| Variation 5 | 9.0 | 1 layer | 50 | 0.32 | 20 |
| Variation 6 | 9.0 | 1 layer | 100 | 0.32 | 18 |

The laser diodes 1 of Variations 1 to 6 oscillate at a low oscillation threshold. For example, the oscillation threshold of Variation 3 is 9 kA/cm$^2$.

In the fabrication of laser diode 1, convex hexagonal pyramidal hillocks (HPHs) sometimes formed after epitaxial growth, worsening the characteristics of the laser diode 1. The HPH density was 6×10$^3$ cm$^{-2}$, for example, and a deterioration in characteristics was observed in that the emission peak of the wavelength shifted towards a longer wavelength. HPHs are thought to form mainly in the vicinity of the threading dislocations in the single crystal AlN substrate. In the laser diodes 1 of the Variations, contact between the HPHs and the p-type electrode was avoided, and laser oscillation was achieved, by suppressing the generation of threading dislocations.

Other

The present disclosure is not limited to the above embodiments and examples. A person of ordinary skill in the art could modify the design of each embodiment, and such modified embodiments are included in the scope of the present disclosure.

REFERENCE SIGNS LIST

1 Laser diode
11 Substrate
12 N-type cladding layer
13 N-type waveguide layer
14 Light-emitting layer
15 P-type waveguide layer
16 P-type longitudinal conduction layer
17 P-type transverse conduction layer
18 P-type contact layer
20 P-type cladding layer
21 Intermediate layer

The invention claimed is:

1. A laser diode comprising:
an AlN single crystal substrate;
an n-type cladding layer formed on the substrate and including a nitride semiconductor layer having n-type conductivity;
a light-emitting layer formed on the n-type cladding layer and including one or more quantum wells;
a p-type cladding layer formed on the light-emitting layer and including a nitride semiconductor layer having p-type conductivity; and
a p-type contact layer formed on the p-type cladding layer and including a nitride semiconductor that includes GaN;
wherein the p-type cladding layer includes
a p-type longitudinal conduction layer that includes $Al_sGa_{1-s}N$ (0.3≤s≤1), has a composition gradient such that an Al composition s decreases with increased distance from the substrate, and has a film thickness of less than 0.5 μm; and
a p-type transverse conduction layer, formed on the p-type longitudinal conduction layer, that includes $Al_tGa_{1-t}N$ (0<t≤1),
wherein an Al composition t of the p-type transverse conduction layer on a surface of the p-type transverse conduction layer adjacent to the p-type longitudinal conduction layer is greater than a minimum value of the Al composition s.

2. The laser diode of claim 1, wherein the p-type cladding layer includes $Al_sGa_{1-s}N$ (0.35<s≤1).

3. The laser diode of claim 1, wherein the p-type transverse conduction layer has a film thickness of 20 nm or less.

4. The laser diode of claim 1, further comprising:
an n-type waveguide layer formed between the n-type cladding layer and the light-emitting layer and configured to confine light in the light-emitting layer; and
a p-type waveguide layer formed between the p-type cladding layer and the light-emitting layer and configured to confine light in the light-emitting layer.

5. The laser diode of claim 4, further comprising an intermediate layer that is formed between the p-type longitudinal conduction layer and the p-type waveguide layer, includes $Al_vGa_{1-v}N$ (0<v≤1.0), and has a composition gradient such that an Al composition v increases with increased distance from the substrate.

6. The laser diode of claim 4, wherein the p-type longitudinal conduction layer is undoped in a region including an interface with the p-type waveguide layer.

7. The laser diode of claim 1, wherein an emission wavelength of the light-emitting layer is 210 nm or more and 300 nm or less.

8. The laser diode of claim 1, wherein a film thickness of the p-type longitudinal conduction layer is 250 nm or more and 450 nm or less.

9. The laser diode of claim 1, wherein the p-type longitudinal conduction layer and the p-type transverse conduction layer are completely strained with respect to the substrate.

* * * * *